United States Patent [19]

Stanley

[11] Patent Number: 5,551,497
[45] Date of Patent: Sep. 3, 1996

[54] DECORATIVE COMPUTER KEYBOARD COVER

[76] Inventor: David B. Stanley, 4576 Plum Orchard La., Stone Mountain, Ga. 30083

[21] Appl. No.: 271,000

[22] Filed: Jul. 5, 1994

[51] Int. Cl.⁶ .................................................. B65D 65/10
[52] U.S. Cl. ....................... 150/154; 235/145 R; 400/714
[58] Field of Search ................................. 150/154, 165; 400/713, 714; 200/302.1, 302.2; 235/145 R

[56] References Cited

U.S. PATENT DOCUMENTS

| | | | |
|---|---|---|---|
| 2,492,262 | 12/1949 | Boyden et al. | 150/165 X |
| 4,060,163 | 11/1977 | Willingham | 235/145 RX |
| 4,119,839 | 10/1978 | Beckmann et al. | 235/145 R |
| 4,758,712 | 7/1988 | Matone, Jr. et al. | 200/302.2 X |
| 4,893,954 | 1/1990 | Kotur | 400/714 |
| 4,922,980 | 5/1990 | Parker | 150/165 |
| 5,021,638 | 6/1991 | Nopper et al. | 200/302.2 X |
| 5,080,155 | 1/1992 | Crozier | 150/154 |
| 5,092,459 | 3/1992 | Uljonic et al. | 200/302.2 |
| 5,165,567 | 11/1992 | Richardson et al. | 150/154 X |
| 5,193,925 | 3/1993 | Foulke | 150/165 X |

OTHER PUBLICATIONS

"Anti-static vinyl dust cover", p. 57, Global Computer Supplies, Jul. 1994.
"Keyboard cover and copyholder", p. 73, Global Computer Supplies, Jul. 1994.
"Keyboard dust cover", p. 138, MacWarehouse, 1993.
"Keyboard dust cover", p. 69, UARCO, 1994.

Primary Examiner—Allan N. Shoap
Assistant Examiner—Christopher J. McDonald
Attorney, Agent, or Firm—Barry E. Kaplan, Esq.

[57] ABSTRACT

A decorative cover for computer keyboards having a covering material assembly (10) of textile fabric, leather, vinyl, or other covering material (12) sewn or otherwise fastened together, configured to conform to the general size and shape of a computer keyboard (22). The cover has a body covering portion (14) and a key covering portion (16). The body covering portion has an opening through which the keyboard keys extend. The body covering portion is held in place on the keyboard by elastic banding (18) and/or hook and loop fastening strips (20). The key covering portion overlays the keyboard keys and extends over and down the front and back sides of the keyboard lapping over the front and back sides of the body covering portion. The key covering portion is held in place by hook and loop fastening strips or other coordinated fastening devices.

13 Claims, 2 Drawing Sheets

DECORATIVE COMPUTER KEYBOARD COVER

RELATED APPLICATIONS

This invention is related to my co-pending application titled "Decorative Computer Monitor Cover" filed 1994 Jul. 5.

BACKGROUND—FIELD OF INVENTION

This invention relates to computer equipment covers, specifically to such covers which are used to cover computer keyboards.

BACKGROUND—DESCRIPTION OF PRIOR ART

Personal computers are standard items of equipment for the modern home and office. Millions of people own personal computers. However, if all these personal computers were lined up side by side they would all basically look the same. For a computer to be truly personal it needs personalizing. It needs a decorative element which can distinguish one person's computer from another's. A way to personalize a computer is by means of a decorative computer keyboard cover.

Computer covers of the prior art, specifically those that cover computer keyboards, are primarily shields that keep dust and spills from coming into contact with the keyboard parts and circuitry. Although not necessarily decorative in design, some covers of the prior art are constructed of colored fabrics. Others are constructed of very undecorative plastic sheet material. Covers of this type are used by loosely draping the cover over the keyboard and must be removed in order to use the keyboard.

Another type of keyboard cover which also must be removed to access the keyboard keys is the hard cover type, examples of which are contained in U.S. Pat. Nos. 4,893,954 to Kotur, 4,546,947 to Gesten, and Des. 322,245 to Lin.

Flexible transparent covers which are molded to fit over the keys of the keyboard allowing the user to type directly on the cover have become common. However, this type of cover prevents direct tactile contact between the fingers and keys. It is also not decorative.

Still another keyboard cover, described in U.S. Pat. No. 5,197,178 to Lichte et al., completely encases the keyboard including the keys. Although very protective, this type of cover also prevents the direct tactile contact between the fingers and keys.

At present none of these covers have been specifically designed to be decorative, to conform to the general size and shape of a computer keyboard, to have the capability to remain in place on the keyboard while the keyboard is in use meanwhile allowing direct tactile contact with the keyboard keys, to be easily removable, and to provide a degree of protection to the keyboard.

SUMMARY OF THE INVENTION

Accordingly, several objects and advantages of the present invention are:

(a) to provide a decorative cover which allows a person to decorate and personalize his or her computer keyboard;

(b) to provide a decorative cover which may be constructed of various fabrics and other covering materials;

(c) to provide a decorative cover which may be of various colors, textures, and patterns either singularly or simultaneously;

(d) to provide a decorative cover to which decorative features may be attached or applied;

(e) to provide a decorative cover which conforms to the general size and shape of a computer keyboard;

(f) to provide a decorative cover which has an opening through which direct tactile contact with the keyboard keys is allowed while the cover remains in place on the keyboard;

(g) to provide a decorative cover which has a key covering portion which is easily removable;

(h) to provide a decorative cover which has securing means to hold the cover in place on the keyboard;

(i) to provide a decorative cover which is easily removable; and (j) to provide a decorative cover which provides a degree of protection to the keyboard.

Still further objects and advantages of the present invention will become apparent to those skilled in the art from a consideration of the following description and drawings.

Reference Numerals

Figure 1:
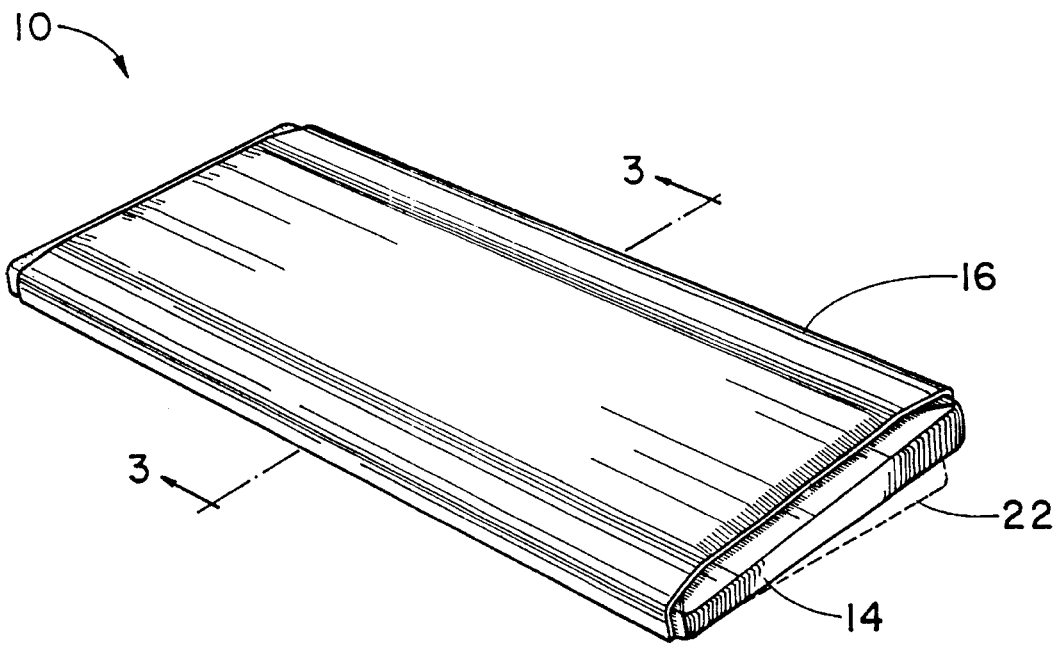
FIG. 1 shows a front perspective view of the present invention shown in place on a computer keyboard.

10. Covering material assembly
12. Covering material
14. Body covering portion
16. Key covering portion
18. Elastic banding
20. Hook and loop fastening strips
22. Keyboard
24. Decorative feature

DETAILED DESCRIPTION

As shown in FIG. 1, the decorative cover of the present invention comprises a covering material assembly 10 configured to conform to the general size and shape of a computer keyboard 22, keyboard 22 being shown in broken lines for illustrative purposes only and forming no part of the present invention. Covering material assembly 10 comprises pieces of textile fabric, leather, vinyl, or other covering material 12 sewn or otherwise fastened together.

Figure 2:
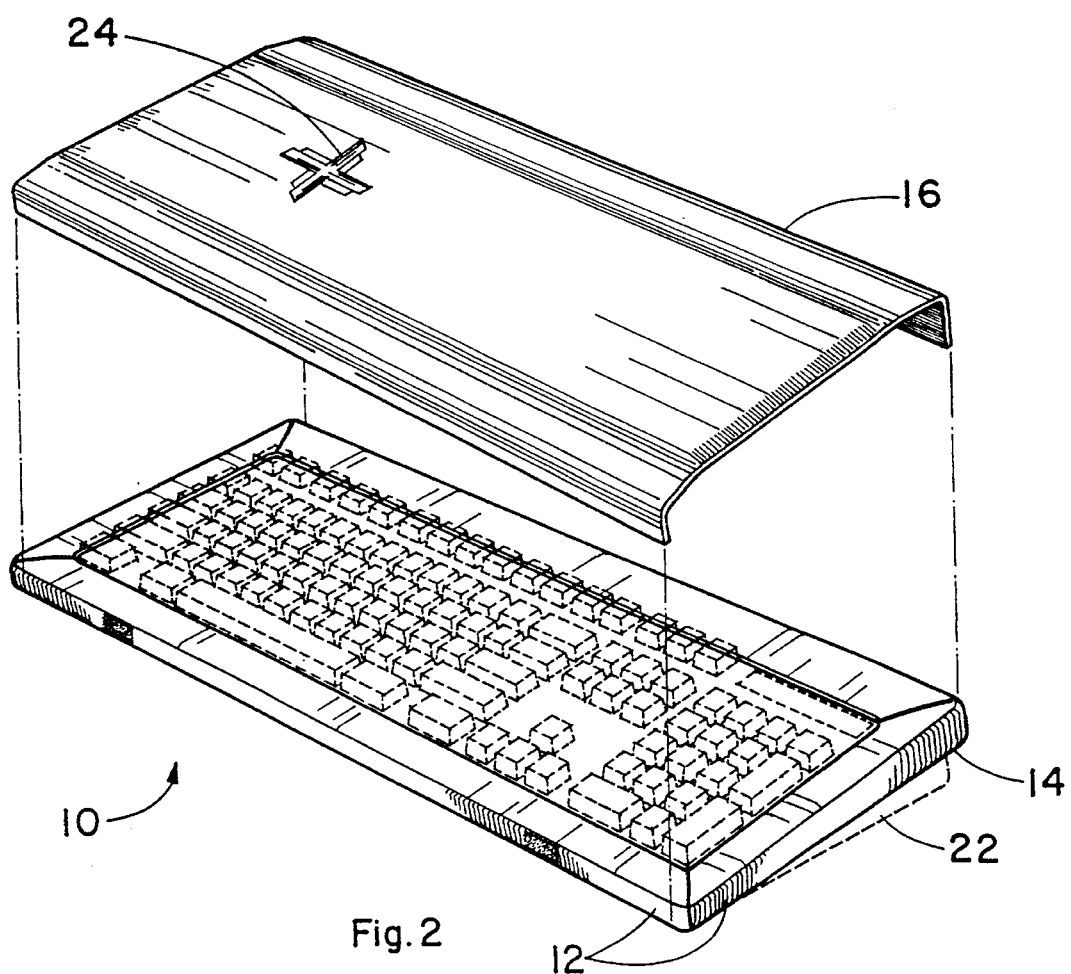
FIG. 2 shows a front perspective view of the present invention showing the key covering portion separated from the body covering portion.

Covering material assembly 10 has a keyboard body covering portion 14 and a keyboard key covering portion 16. Body covering portion 14 has an opening, configured to conform to the general size and shape of the area of keyboard 22 containing the keyboard keys, through which opening the keys extend. Key covering portion 16 overlays the keyboard keys and extends over and down the front and back sides of body covering portion 14. Key covering portion 16 is fastened to body covering portion 14 by hook and loop fastening strips 20 or other cooperating fastening devices. FIG. 2 shows the decorative cover with the key covering portion 16, being removable, separated from the body covering portion 14. A decorative feature 24 is shown attached to the key covering portion 16 and is shown for illustrative purposes only in that the decorative feature 24 may be of any form or material and is not restricted to the configuration as shown.

Figure 3:
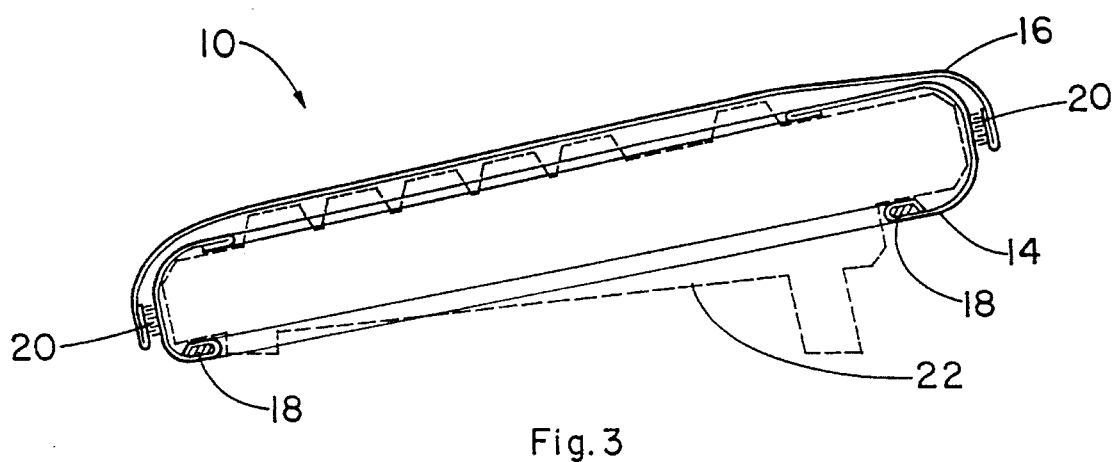
FIG. 3 hows a sectional view taken along line 3—3 of FIG. 1 showing the securing means of the body covering portion comprised of elastic banding.
Figure 4:
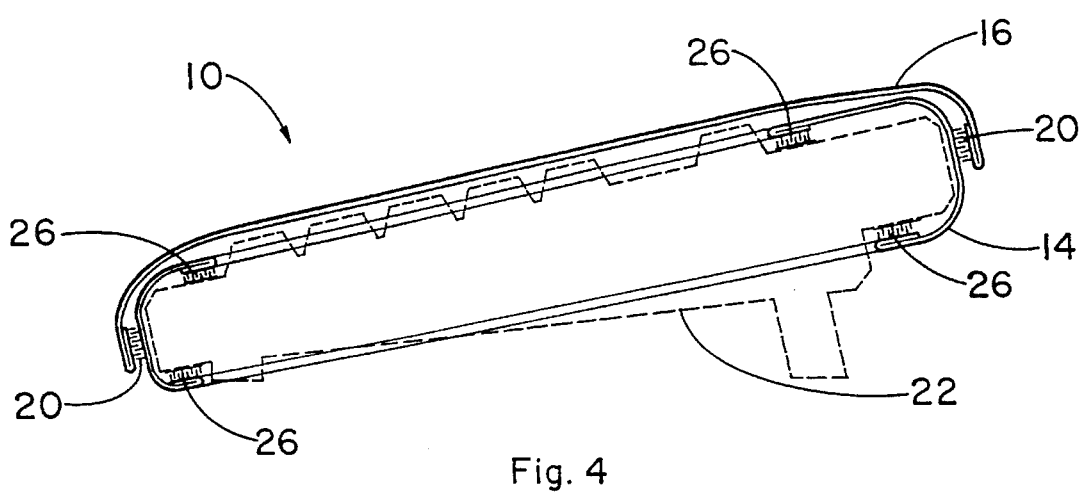
FIG. 4 shows a sectional view taken along line 3—3 of FIG. 1 showing the securing means of the body covering portion comprised of hook and loop fastening strips.
Figure 5:
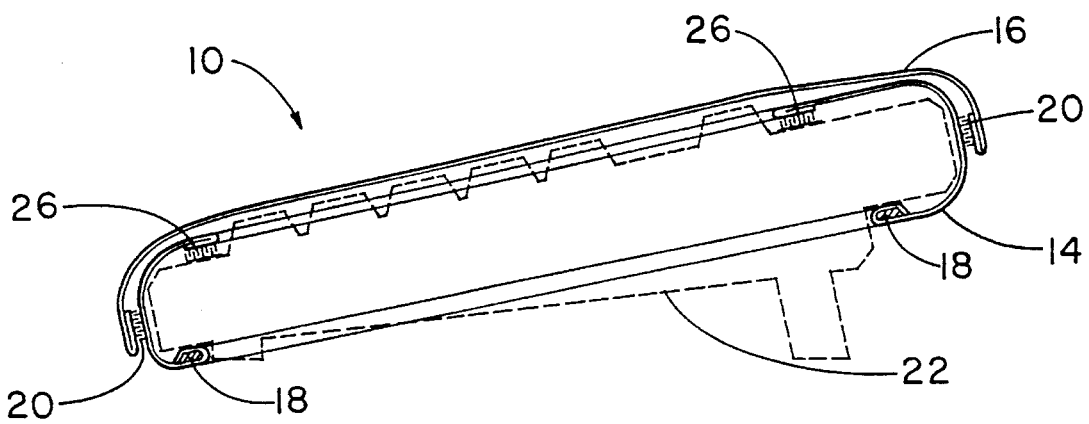
FIG. 5 shows a sectional view taken along line 3—3 of FIG. 1 showing the securing means of the body covering portion comprised of elastic banding and hook and loop fastening strips.

Applied to body covering portion 14 of covering material assembly 10 is a securing means for holding the decorative cover in place on keyboard 22. FIG. 3 shows the securing means comprised of elastic banding 18. FIG. 4 shows the securing means comprised of hook and loop fastening strips 26. FIG. 5 shows the securing means comprised of elastic banding 18 and hook and loop fastening strips 26.

Covering material assembly 10 and the securing means are the principal components of the present invention. The specific size and shape of the decorative cover will be dependent on the size and shape of the computer keyboard for which it is intended to cover. Thus, it is to be understood that the embodiments of the decorative cover shown in the accompanying drawings are for the purposes of illustration only and that the configuration of the decorative cover may vary depending on the configuration of any computer keyboard without departing from the present invention.

Operation

The manner of using the present invention is as described in the following:

The embodiment of the covering material assembly 10 as shown in FIG. 1 is placed on a computer keyboard by first inserting one end of the keyboard 22 into the coordinating end of the body covering portion 14. The body covering portion 14 is then pulled over the opposite end of the keyboard 22. The securing means as shown in FIGS. 3, 4, and 5, comprising either elastic banding 18 and/or hook and loop fastening strips 26, are then engaged and adjusted so that the body covering portion 14 is seated properly on the keyboard 22.

As shown in FIGS. 1 and 2 of the preferred embodiment, the key covering portion 16 is attached to the body covering portion 14 by hook and loop fastening strips 20.

APPLICATION SUMMARY AND SCOPE

Thus the reader will see that the decorative cover of the present invention provides a way to personalize and decorate a personal computer, specifically a computer keyboard, that it can be constructed of many different covering materials having various colors, textures, and patterns, and that it can have decorative features applied to it. The reader will also see that the present invention can be conformed to the size and shape of a computer keyboard, that it has securing means to hold it in place on the keyboard, and that the body covering portion can remain in place on the keyboard while the keyboard is in use. Further, the reader will see that the present invention is easily removable and that it provides a degree of protection to the keyboard.

Having described the foregoing embodiments of the present invention, other and different embodiments will become apparent to those skilled in the art without departing from the scope of the present invention. It is intended that all such embodiments may fall within the scope of the appended claims.

What is claimed is:

1. A decorative computer keyboard cover for covering a computer keyboard having a front side and a back side and a plurality of keys, said decorative computer keyboard cover comprising:

a covering material assembly including:
a keyboard body covering portion having a front side disposed in overlapping engagement with the front side of the keyboard and a back side disposed in overlapping engagement with the back side of the keyboard, when said keyboard body covering portion is disposed in engagement with the keyboard;
a keyboard key covering portion; and
fastening means adapted to said keyboard body covering portion and said keyboard key covering portion for selectively attaching and detaching said keyboard covering portion to and from said keyboard body covering portion, and securing means adapted to said keyboard body covering portion for holding said keyboard body covering portion in place on the keyboard, wherein said keyboard key covering portion overlays the keyboard keys and extends over and down the front and back sides of the keyboard in overlapping engagement with the front and back sides of said keyboard body covering portion.

2. The decorative cover of claim 1 wherein said covering material assembly comprises flexible sheet material conformable to the size and shape of the keyboard.

3. The decorative cover of claim 1 wherein said covering material assembly further includes decorative indicia attached to said covering material assembly.

4. The decorative cover of claim 1 wherein said keyboard body covering portion defines at least one opening sized and configured to allow the keyboard keys to extend therethrough such that said keyboard body covering portion may remain disposed in engagement with the keyboard while the keyboard is in use.

5. The decorative cover of claim 1 wherein said fastening means comprises at least one hook and loop fastening strip cooperatively engaged with said keyboard body covering portion and said keyboard key covering portion.

6. The decorative cover of claim 1 wherein said securing means comprises an elastic band.

7. The decorative cover of claim 1 wherein said securing means comprises at least one hook and loop fastening strip, said hook and loop fastening strip having a first cooperating member disposed in engagement with the keyboard and a second cooperating member disposed in engagement with said keyboard body covering portion.

8. The decorative cover of claim 1 wherein said securing means comprises an elastic band and at least one hook and loop fastening strip said hook and loop fastening strip having a first cooperating member disposed in engagement with the keyboard and a second cooperating member disposed in engagement with said keyboard body covering portion.

9. The decorative cover of claim 2 wherein said flexible sheet material comprises fabric.

10. The decorative cover of claim 2 wherein said flexible sheet material comprises leather.

11. The decorative cover of claim 2 wherein said flexible sheet material comprises vinyl.

12. A cower assembly for use with a computer keyboard, the keyboard comprising a keyboard case having an upper case side and adjacent side surfaces extending downwardly from the upper case side, and a plurality of keys extending upwardly from the keyboard relative to the upper case side, the keyboard upper case side defining a perimeter extending along the upper case side between the keys and the adjacent side surfaces, said cover comprising:

a keyboard body cover engageable with the keyboard and sized and configured to cover the keyboard perimeter and the side edge surfaces, the keys of the keyboard remaining exposed for use when said keyboard body cover is engaged with the keyboard; and securing means adapted to said keyboard body cover and the keyboard for selectively securing said keyboard body cover in position on the keyboard.

13. The cover assembly of claim 12 further including a keyboard key cover adapted to overlay the keys and the perimeter of the keyboard and to extend in overlapping engagement with said keyboard body cover adjacent to the side edge surfaces of the keyboard, and fastening means adapted to said keyboard key cover and said keyboard body cover for fixedly yet releasably engaging said keyboard key cover with said keyboard body cover.

* * * * *